3,636,196
ETHYLETHYLENEIMINE AS AN INACTIVATION AGENT
Kurt Bauer, Gunther Wittman, and Manfred Mussgay, Tubingen, Germany, assignors to Farbenfabriken Bayer Aktiengesellschaft, Leverkusen, Germany
No Drawing. Filed May 8, 1970, Ser. No. 35,932
Claims priority, application Germany, May 13, 1969, P 19 34 303.9
Int. Cl. A61k 27/00
U.S. Cl. 424—89
12 Claims

ABSTRACT OF THE DISCLOSURE

Ethylethyleneimine is used as an inactivation agent in the production of inactivated antigens such as virus vaccines for pharmaceutical preparations.

BACKGROUND OF THE INVENTION

Field of the invention

This invention relates to the use of ethylethyleneimine as an inactivation agent during the production of inactivated antigens for pharmaceutical preparations.

Description of the prior art

For the production of pharmaceutical preparations, inactivation methods or means are necessary, which, on the one hand, assuredly destroy the infectiousness, whereby, however, on the other hand, the antigen characteristic will be preserved. In order to obtain surely inactivated preparations, this process must take its course in a reaction of the first order, so that the time of complete loss of the infectiousness can be assuredly determined. This is not the case with many customary inactivation agents however, such as for example in the case of Formalin or in the case of beta-propiolactone. Agents other than these, which do not have this disadvantage however, are not very stable and at room temperature they show an uncontrollable loss of activity, such as for example acetylethyleneimine.

Accordingly it is clear that a distinct need remains in the art for an inactivation agent which overcomes the disadvantages of the prior art in being stable, retaining its activity and providing excellent results. The present invention meets these requirements.

SUMMARY OF THE INVENTION

It is accordingly one object of the invention to provide an inactivation agent which overcomes or otherwise mitigates the problems of the prior art.

A further object of the invention is to provide methods for the use of ethylethyleneimine as an inactivation agent during the production of inactivated antigens such as virus vaccines for pharmaceutical preparations.

Other objects and advantages of the invention will become apparent as the description thereof proceeds.

In satisfaction of the foregoing objects and advantages there is provided by the present invention a method for the production of inactivated antigens for pharmaceutical preparations by the addition thereto of ethylethyleneimine as an inactivation agent.

DESCRIPTION OF PREFERRED EMBODIMENTS

According to the present invention it has been discovered that ethylethyleneimine is a valuable inactivation agent in the production of inactivated antigens for pharmaceutical preparations. Thus it has now been found that ethylethyleneimine, which inactivates viruses in a reaction of the first order, preserves their antigenicity, is well storable even at room temperature and can be used successfully as an inactivation agent in the production of inactivated antigens for pharmaceutical preparations.

The ethylethyleneimine may be used for the inactivation of pharmaceutical preparations and especially for the inactivation of virus vaccines. Illustrative of such applications is use of the ethylethyleneimine (referred to as EEI) for inactivation of the virus of hoof and mouth disease as obtained from any suitable culture, e.g., from an infected culture of calf kidney cells, as well as for inactivation of viruses of infectious bovine rhinotracheitis and the like. Obviously, other viruses may also be inactivated according to the teachings of the invention.

The ethylethyleneimine is employed in quantities ranging from about 0.01 to 1.0% (volume/volume). The period for use, depending on the conditions of the experiments, usually ranges from a few hours to five days. The inactivation procedure is generally carried out at temperatures ranging between about 0° and 40° C. with a preferred temperature range for practicing the invention being about 20° to 40° C. A very convenient procedure is to carry out the inactivation at about room temperature.

For use in the process the ethylethyleneimine is preferably initially neutralized or brought to a neutral pH by the slow addition of a mineral acid, for example hydrochloric acid, although any other suitable means may be used.

The following examples are presented to illustrate the invention but it is not to be considered as limited thereto.

EXAMPLE I 0.1% (vol./vol.) ethylethyleneimine (EEI) was added to a suspension of the virus of the mouth and hoof disease (as strain, $O_1$ Kaufbeuren)—a representative of the viruses containing ribonucleic acid—in the form of the culture broth of an infected culture of primary calf kidney cells, said ethylethyleneimine having been previously brought to a neutral pH value through drop-by-drop addition of hydrochloric acid. The mixture was kept at 37° C. and samples were taken from it every hour. The inactivation in each instance was stopped up by the addition of 10 volume percent of a 20% sodium thiosulfate. The samples then were transmitted by inoculation, undiluted and in 10 stages diluted, for every 10 tubules with calf kidney cells in a quantity of 0.1 ml. The virus titers found in this case resulted in a decline with increase in time, which corresponded to a reaction of the first order. After five hours of action time, no infectiousness could be proven to exist any more even in the case of transmission by inoculation of five-fold the quantity of virus mentioned above.

A virus solution treated in such a way for 6 hours was inoculated subcutaneously at a quantity of 1.5 ml. in five guinea pigs. None of the animals showed any kind of symptoms of a disease, but during examination 3 weeks after the inoculation, they had neutralizing antibodies against the unpretreated, infectious starting virus in the serum.

EXAMPLE II

The process described in Example I was repeated, using 0.05% vol./vol. of EEI in place of 0.1% vol./vol. In this case too, a linear decrease in the infectiousness resulted, in the course of the treatment. After 11 hours and after inoculation of even five times the quantity of virus, no infectiousness could be proven any more.

The inoculation each time of 1.5 ml. of a virus treated in such a manner for 24 hours did not cause any symptoms of disease whatever in the case of 20 guinea pigs. Three weeks after the injection, all animals had neutralizing antibodies against the starting virus in the serum.

EXAMPLE III

The process described in Example I was repeated, using 0.05% vol./vol. EEI instead of 0.1% and at an effective temperature of 22° C. instead of 37° C. As time progressed, a linear decrease in the infectiousness likewise resulted. After 52 hours, no infectious virus could be found any more.

EXAMPLE IV

According to the process decribed in Example I and using 0.05% vol./vol. EEI in place of 0.1% vol./vol. EEI, mouth and hoof disease virus was treated 16, 18 and 24 hours. In the case of inoculation, of each time 9 ml. on calf kidney cultures, as well as after the intramuscular injection of each time 10 ml. into 3 susceptible piglets, no infectiousness whatever was found.

The inactivated vircus solution was mixed in equal parts with incomplete Freund's adjuvant and in each case 2 ml. of these vaccines were inoculated in 5 pigs. After the vaccination, neutralizing antibodies were found in the serum of all animals. Eight weeks after the vaccination with the vaccine inactivated for 16 hours, 4 of 5 pigs, and, with the other two vaccines, 3 of 5 pigs were immune with regard to a massive infection of active virus of the same type. The remaining animals became sick in a milder manner than did the controls.

EXAMPLE V

As described in Example II, mouth and hoof disease virus was treated for 24 hours with EEI and its harmlessness was determined as in Example IV. 50 mg./ml. DEAE dextran (diethylaminaethyldextran) was added to the virus suspension and these vaccines were injected subcutaneously in quantities of 10 ml. each time into 20 pigs. All animals developed neutralized antibodies against the active virus. Eight weeks after the vaccination, 18 of the 20 pigs were immune to infection with active mouth and hoof disease virus of the same type, the other two becoming sick in an essentially milder manner than the controls without pretreatment.

EXAMPLE VI

The process described in Example I was used for the inactivation of the virus of the infectious bovine rhinotracheitis (IBR)—a representative of the viruses containing desoxyribonucleic acid—in place of mouth and hoof disease virus. Here too a decrease in the infectiousness could be determined with increasing time, which corresponds to a reaction of the first order. After an action time of 16 hours, no infectiousness could be found any more. Each time 2 ml. of a virus solution treated for 16 hours were injected intramuscularly in 10 guinea pigs. Three weeks after the vaccination, neutralizing antibodies against the IBR virus were found in the serum of these animals.

EXAMPLE VII

The process described in Example VI was repeated using 0.05% vol./vol. EEI instead of 0.1%. Here too a linear decrease in the infectiousness resulted and after 20 hours no infectiousness could be found any more.

EXAMPLE VIII 0.5% vol./vol. EEI, which already had been stored for 14 months at room temperature, and EEI, which had been freshly procured and which had been kept at only 4° C., were added in parallel to a suspension of the "Sindbis" virus in the form of an infected culture broth of a baby hamster kidney cell line, in the manner described in Example I. Samples were taken every hour, were neutralized through addition of altogether 2% sodium thiosulfate and were innoculated undiluted, as well as diluted, in 10 stages at a quantity of 0.03 ml. into each of five baby mice intracerebrally. The infectiousness of the virus solution was lost in completely the same manner in the case of both inactivations with progressing time. That meant the EEI preserved for 14 months at room temperature had kept the same effectiveness as fresh cooly stored EEI.

The invention has been described herein with reference to certain preferred embodiments. However, it is not to be considered as limited thereto as obvious variations thereon will become apparent to those skilled in the art.

What is claimed is:

1. A method for the production of the inactive virus of hoof and mouth disease which comprises adding thereto about .01 to 1.0% (volume/volume) of ethylethyleneimine.

2. A method according to claim 1 wherein the inactivation is conducted at a temperature of about 0–40° C.

3. A method according ot claim 2 wherein the temperature ranges from 20°–40° C.

4. A method for the production of the inactivated virus of infectious bovine rhinotracheitis which comprises adding thereto about .01 to 1.0% (volume/volume) of ethylethyleneimine.

5. A method according to claim 4 wherein the inactivation is conducted at a temperature of about 0–40° C.

6. A method according to claim 5 wherein the temperature ranges from 20°–40° C.

7. A method for the production of the inactivated "Sindbis" virus which comprises adding thereto about .01 to 1.0% (volume/volume) of ethylethyleneimine.

8. A method according to claim 7 wherein the inactivation is conducted at a temperature of about 0°–40° C.

9. A method according to claim 8 wherein the temperature ranges from 20°–40° C.

10. A pharmaceutical composition containing an immunological effective amount of an inactive antigen comprising the virus of hoof and mouth disease and .01 to 1.0% (volume/volume) of ethylethyleneimine.

11. A pharmaceutical composition containing an immunological effective amount of an inactive antigen comprising the virus of infectious bovine rhinotracheitis and .01 to 1.0% (volume/volume) of ethylethyleneimine.

12. A pharmaceutical composition containing an immunological effective amount of the "Sindbis" virus and about .01 to 1.0% (volume/volume) of ethylethyleneimine.

References Cited

UNITED STATES PATENTS 3,318,775 5/1967 Melvin et al. -------- 424—89

RICHARD L. HUFF, Primary Examiner

U.S. Cl. X.R.

195—1.4